United States Patent
Meiss et al.

(10) Patent No.: US 7,259,509 B2
(45) Date of Patent: Aug. 21, 2007

(54) PHOSPHOR COATING COMPOSITION FOR A MERCURY LOW-PRESSURE DISCHARGE LAMP FOR ILLUMINATING PLANTS

(75) Inventors: Dieter Meiss, Stadtbergen (DE); Matthias Schiplage, Friedberg (DE); Martin Zachau, Geltendorf (DE)

(73) Assignee: Patent-Treuhand-Gesellschaft feur Elektrische Gluehlampen mbH, Munich (DE)

( * ) Notice: Subject to any disclaimer, the term of this patent is extended or adjusted under 35 U.S.C. 154(b) by 294 days.

(21) Appl. No.: 11/080,503

(22) Filed: Mar. 16, 2005

(65) Prior Publication Data

US 2005/0206296 A1 Sep. 22, 2005

(30) Foreign Application Priority Data

Mar. 22, 2004 (DE) .................. 10 2004 013 915

(51) Int. Cl.
- *H01J 1/62* (2006.01)
- *C09K 11/02* (2006.01)
- *C09K 11/08* (2006.01)
- *C09K 11/77* (2006.01)

(52) U.S. Cl. .............................. 313/487; 252/301.6 R; 252/304.4 R; 252/301.4 P; 252/301.4 H

(58) Field of Classification Search ......... 252/301.4 R, 252/301.6 R, 301.4 P, 301.4 H
See application file for complete search history.

(56) References Cited

U.S. PATENT DOCUMENTS

| | | | | |
|---|---|---|---|---|
| 2003/0076029 A1* | 4/2003 | Gruber et al. | ............. | 313/486 |
| 2005/0219476 A1* | 10/2005 | Beeson et al. | ............. | 353/98 |
| 2005/0236959 A1* | 10/2005 | Toth et al. | ............. | 313/486 |
| 2005/0280785 A1* | 12/2005 | Beeson et al. | ............. | 353/97 |
| 2006/0066192 A1* | 3/2006 | Beeson et al. | ............. | 313/112 |
| 2006/0071225 A1* | 4/2006 | Beeson et al. | ............. | 257/98 |
| 2006/0203468 A1* | 9/2006 | Beeson et al. | ............. | 362/84 |
| 2006/0214173 A1* | 9/2006 | Beeson et al. | ............. | 257/88 |
| 2006/0284190 A1* | 12/2006 | Zimmerman et al. | ......... | 257/79 |
| 2007/0085105 A1* | 4/2007 | Beeson et al. | ............. | 257/100 |
| 2007/0086211 A1* | 4/2007 | Beeson et al. | ............. | 362/628 |

* cited by examiner

*Primary Examiner*—Joseph Williams
*Assistant Examiner*—Bumsuk Won
(74) *Attorney, Agent, or Firm*—Robert F. Clark

(57) ABSTRACT

The invention relates to a fluorescent lamp for the illumination of plants, having a tubular discharge vessel, two electrodes which are fused in a gastight manner into the ends of the discharge vessel, a fill comprising at least a noble gas and mercury, and a phosphor coating on the inner wall of the vessel, the phosphor coating at least including a europium-doped barium magnesium aluminate phosphor of the $BaMgAl_{10}O_{17}$:Eu type and a cerium- and terbium-doped gadolinium zinc magnesium pentaborate phosphor of the $Gd(Zn,Mg)B_5O_{10}$:Ce,Mn type, and, to generate light with as high a light yield as possible and with a color temperature of between 4000 and 5500 K, the phosphor coating additionally includes an antimony- and manganese-doped calcium halophosphate phosphor of the $Ca_{10}(PO_4)_6(F,Cl)_2$:Sb,Mn type. This novel phosphor coating allows the light yield to be increased by 10% if the proportion by weight of the individual phosphors is optimized.

12 Claims, 2 Drawing Sheets

PHOSPHOR COATING COMPOSITION FOR A MERCURY LOW-PRESSURE DISCHARGE LAMP FOR ILLUMINATING PLANTS

TECHNICAL FIELD

The invention is based on a mercury low-pressure discharge lamp for illuminating plants having a tubular discharge vessel, two electrodes which are fused in a gastight manner into the ends of the discharge vessel, a fill comprising at least a noble gas and mercury, and a phosphor coating on the inner wall of the vessel, the phosphor coating at least including a europium-doped barium magnesium aluminate phosphor of the $BaMgAl_{10}O_{17}$:Eu type and a cerium- and terbium-doped gadolinium zinc magnesium pentaborate phosphor of the $Gd(Zn,Mg)B_5O_{10}$:Ce,Mn type.

BACKGROUND ART

Hitherto, for illuminating plants OSRAM has used mercury low-pressure discharge lamps in the form of fluorescent lamps which have a phosphor coating comprising the two phosphors listed above, namely $BaMgAl_{10}O_{17}$:Eu and $Gd(Zn,Mg)B_5O_{10}$:Ce,Mn, as well as a tin-doped strontium magnesium orthophosphate phosphor of the $(Sr,Mg)_3(PO_4)_2$:Sn type in a ratio of approximately 22% by weight: 17% by weight: 61% by weight. However, the use of the $(Sr,Mg)_3(PO_4)_2$:Sn phosphor has two drawbacks:

1. The grain size of the $(Sr,Mg)_3(PO_4)_2$:Sn phosphor is significantly larger than that of the other two phosphors. This leads to a considerable color gradient along the lamp, in particular in the case of long lamps with a high wattage of greater than 36 W.
2. The tin doping of the $(Sr,Mg)_3(PO_4)_2$:Sn leads to a high mercury consumption, which in the case of T8 fluorescent lamps with a tube diameter of 26 mm amounts to more than double that of all other T8 fluorescent lamp types, for example 3.5 mg in 2000 h in the case of a fluorescent lamp with a power consumption of 58 W. In addition, this leads to considerable graying and therefore poor maintenance.

DISCLOSURE OF THE INVENTION

Therefore, it is an object of the present invention to provide a mercury low-pressure discharge lamp having a novel phosphor composition for the illumination of plants which avoids the drawbacks referred to above.

This object is achieved by a fluorescent lamp for the illumination of plants having a tubular discharge vessel, two electrodes which are fused in a gastight manner into the ends of the discharge vessel, a fill comprising at least a noble gas and mercury, and a phosphor coating on the inner wall of the vessel, in which, to generate light with as high a light yield as possible and with a color temperature of between 4000 and 5500 K, the phosphor coating, in addition to a europium-doped barium magnesium aluminate phosphor of the $BaMgAl_{10}O_{17}$:Eu type and a cerium- and terbium-doped gadolinium zinc magnesium pentaborate phosphor of $Gd(Zn,Mg)B_5O_{10}$:Ce,Mn type, also includes an antimony- and manganese-doped calcium halophosphate phosphor of the $Ca_{10}(PO_4)_6(F,Cl)_2$:Sb,Mn type.

Particularly good results with regard to light yield and color rendering are achieved if the $BaMgAl_{10}O_{17}$:Eu phosphor forms between 15 and 35% by weight, advantageously between 20 and 30% by weight, of the phosphor coating of the lamp, the $Gd(Zn,Mg)B_5O_{10}$:Ce,Mn phosphor forms between 25 and 45% by weight, advantageously between 30 and 40% by weight, of the phosphor coating of the lamp, and the $Ca_{10}(PO_4)_6(F,Cl)_2$:Sb,Mn phosphor forms between 30 and 50% by weight, advantageously between 35 and 45% by weight, of the phosphor coating of the lamp.

The phosphor coating comprising the $BaMgAl_{10}O_{17}$:Eu phosphor, the $Gd(Zn,Mg)B_5O_{10}$:Ce,Mn phosphor and the $Ca_{10}(PO_4)_6(F,Cl)_2$:Sb,Mn phosphor may be applied in one layer. However, it is also conceivable for the individual phosphors in each case to be applied in a separate layer to the inner wall of the lamp vessel.

BRIEF DESCRIPTION OF THE DRAWINGS

The invention is to be explained in more detail below on the basis of graphs. In the drawing.

BEST MODE FOR CARRYING OUT THE INVENTION

Figure 1:
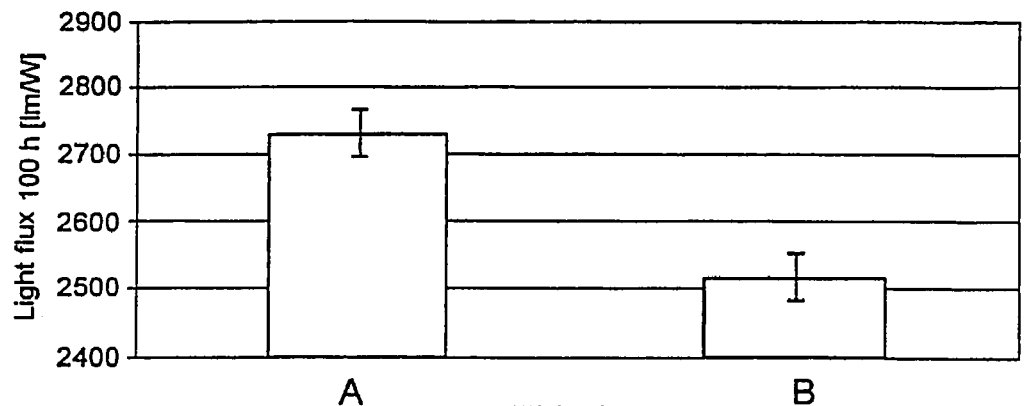
FIG. 1 shows the light yield (after an operating time of 100 hours) for a fluorescent lamp with a power consumption of 58 W having the phosphor composition B which has been used hitherto and the novel phosphor composition A according to the invention.
Figure 2:
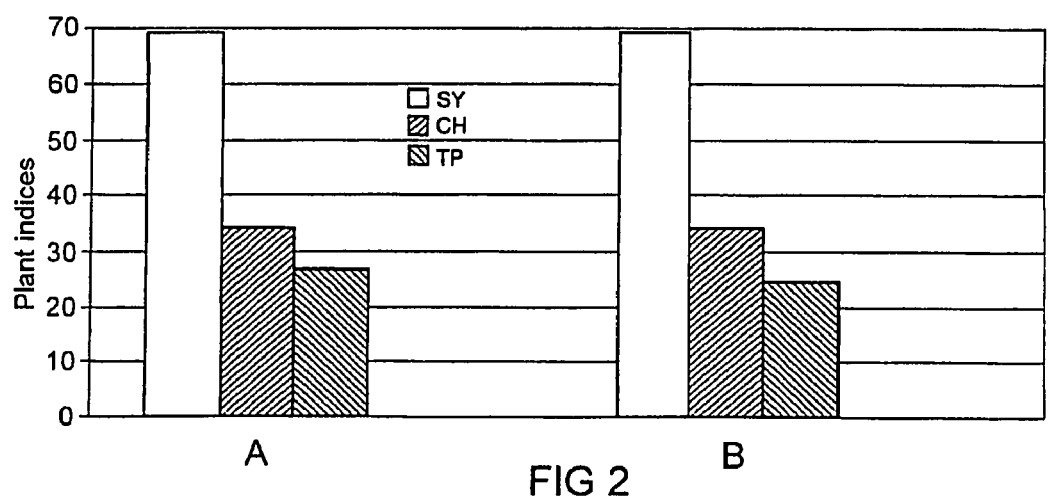
FIG. 2 shows the value of the plant indices for photosynthesis SY, chlorophyl synthesis CH and phototropism TP for a fluorescent lamp with a power consumption of 58 W and having the phosphor composition B that has been used hitherto and the novel phosphor composition A according to the invention.
Figure 3:
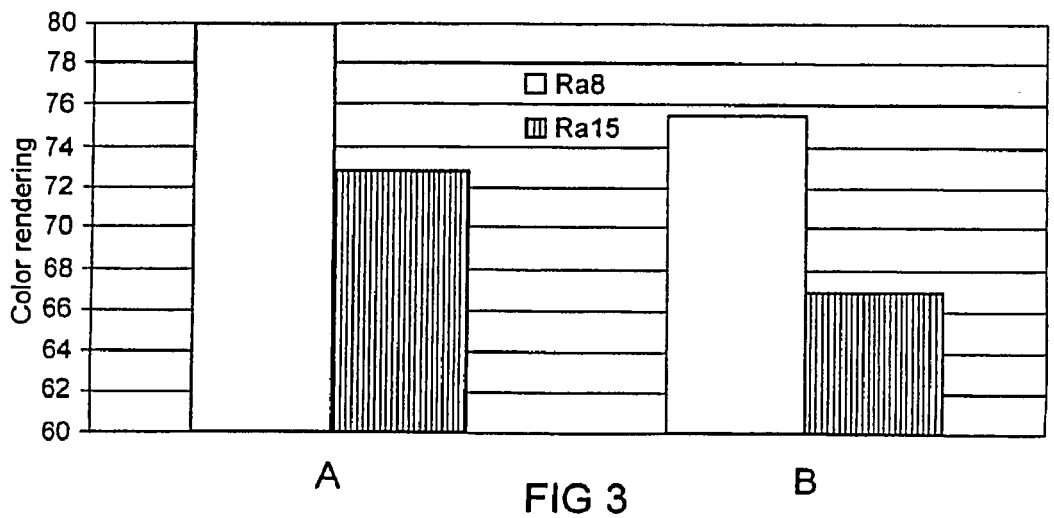
FIG. 3 shows the level of the color rendering indices Ra8 and Ra15 for a fluorescent lamp with a power consumption of 58 W and having the phosphor composition B that has been used hitherto and the novel phosphor composition A according to the invention.

A fluorescent lamp according to the invention having an optimum phosphor coating A consisting of 25% by weight of $BaMgAl_{10}O_{17}$:Eu phosphor, 34% by weight of $Gd(Zn,Mg)B_5O_{10}$:Ce,Mn phosphor and 41% by weight of $Ca_{10}(PO_4)_6(F,Cl)_2$:Sb,Mn phosphor, was tested. The light engineering measurements showed the following improvements over the lamps having the phosphor coating B that has been used hitherto, composed of the phosphors $BaMgAl_{10}O_{17}$:Eu, $Gd(Zn,Mg)B_5O_{10}$:Ce,Mn and $(Sr_{0.9}Mg_{0.1})_3(PO_4)_2$:Sn in a ratio of 22% by weight: 17% by weight: 61% by weight. The results are given in FIGS. 1 to 3:

1. The light yield of the lamps having the novel phosphor composition A is 10% higher than the light yield of the lamps having the phosphor composition B that has been used hitherto.
2. The plant index CH for chlorophyl synthesis, which is relevant to plant growth in accordance with DIN 5031-10 of 1979, is virtually equal for both phosphor compositions; the novel phosphor composition A results in a slight increase in the indices for photosynthesis SY and phototropism TP in accordance with DIN 5031-10 of 1979.
3. The color rendering index R8 rises from 75 to 80 for the novel phosphor composition A, and the color rendering index R15 rises from 67 to just under 73 for the novel phosphor composition A, thereby complying with color rendering level 1b.
4. The phosphor weight in the fluorescent lamp having the novel phosphor composition is 3.7 g instead of 4.5 g with the old phosphor composition and is therefore reduced by 18%. This more than compensates for the higher costs of the novel phosphor mixture.

Figure 4:
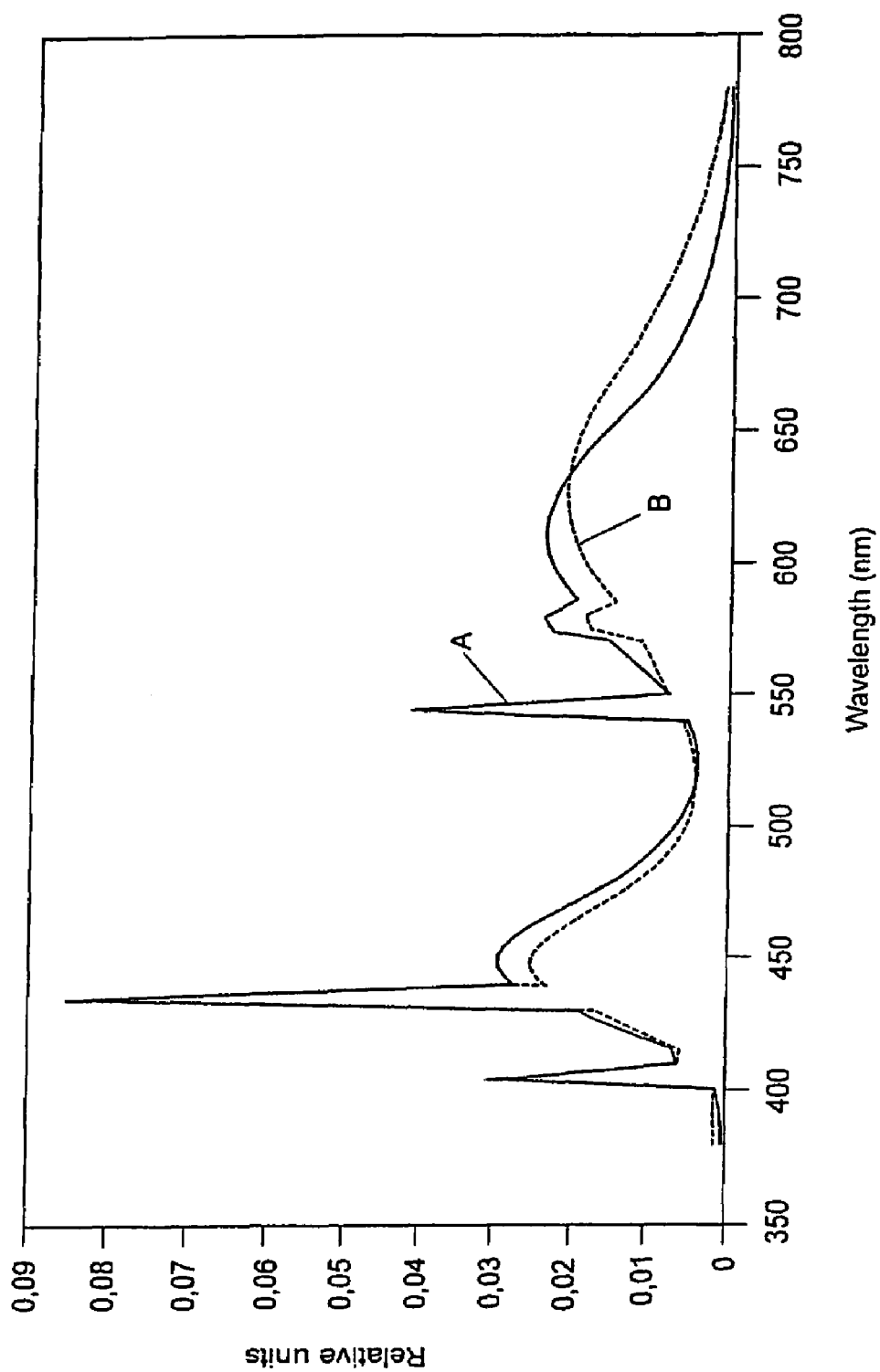
FIG. 4 shows the emission spectrum of a fluorescent lamp having the phosphor composition B that has been used hitherto and the novel phosphor composition A according to the invention.

FIG. 4 plots the emission spectrum of a fluorescent lamp having the phosphor coating B that has been used hitherto and a fluorescent lamp having the novel phosphor coating A according to the invention in relative units as a function of the wavelength in nm. Both spectra are standardized to the same area. The color locus of the two phosphor coatings is identical, lying at x/y=0.338/0.243. The color temperature is 4700 K.

The use of the calcium halophosphate phosphor of type $Ca_{10}(PO_4)_6(F,Cl)_2$:Sb,Mn instead of the tin-doped strontium magnesium orthophosphate phosphor of the $(Sr,Mg)_3(PO_4)_2$:Sn type better matches the grain sizes of the phosphors used in the phosphor mixture. This leads firstly to more uniform mixing of the phosphors in the coating and secondly to a reduction in the color gradient.

What is claimed is:

1. Phosphor coating composition for a mercury low-pressure discharge lamp for illuminating plants, the phosphor coating composition consisting of:
   15 to 35% by weight of a $BaMgAl_{10}O_{17}$:Eu phosphor;
   25 to 45% by weight of a $Gd(Zn,Mg)B_5O_{10}$:Ce, Mn phosphor; and
   30 to 50% by weight of a $Ca_{10}(PO_4)_6(F,Cl)_2$:Sb, Mn phosphor.

2. The phosphor coating composition of claim 1 wherein the coating composition consists of:
   20 to 30% by weight of the $BaMgAl_{10}O_{17}$:Eu phosphor;
   30 to 40% by weight of the $Gd(Zn,Mg)B_5O_{10}$:Ce, Mn phosphor; and
   35 to 45% by weight of the $Ca_{10}(PO_4)_6(F,Cl)_2$:Sb,Mn phosphor.

3. The phosphor coating composition of claim 1 wherein the phosphor coating composition when excited by the low-pressure mercury discharge emits light having a plant CH index of about 34, a SY index of about 69, and a TP index of about 27.

4. The phosphor coating composition of claim 1 wherein the phosphor coating composition when excited by the low-pressure mercury discharge emits light having a color temperature of between 4000 and 5500 K.

5. The phosphor coating composition of claim 1 wherein the coating composition contains 20 to 30% by weight of the $BaMgAl_{10}O_{17}$:Eu phosphor.

6. The phosphor coating composition of claim 5 wherein the coating composition contains 30 to 40% by weight of the $Gd(Zn,Mg)B_5O_{10}$:Ce,Mn phosphor.

7. The phosphor coating composition of claim 5 wherein the coating composition contains 35 to 45% by weight of the $Ca_{10}(PO_4)_6(F,Cl)_2$:Sb,Mn phosphor.

8. The phosphor coating composition of claim 1 wherein the coating composition contains 30 to 40% by weight of the $Gd(Zn,Mg)B_5O_{10}$:Ce,Mn phosphor.

9. The phosphor coating composition of claim 8 wherein the coating composition contains 35 to 45% by weight of the $Ca_{10}(PO_4)_6(F,Cl)_2$:Sb,Mn phosphor.

10. The phosphor coating composition of claim 1 wherein the coating composition contains 35 to 45% by weight of the $Ca_{10}(PO_4)_6(F,Cl)_2$:Sb,Mn phosphor.

11. The phosphor coating composition of claim 1 wherein the composition has a plurality of layers.

12. A phosphor coating composition for a mercury low-pressure discharge lamp for illuminating plants, the phosphor coating composition consisting of:
    25% by weight of a $BaMgAl_{10}O_{17}$:Eu phosphor;
    34% by weight of a $Gd(Zn,Mg)B_5O_{10}$:Ce,Mn phosphor; and
    41% by weight of a $Ca_{10}(PO_4)_6(F,Cl)_2$:Sb,Mn phosphor.

* * * * *